July 26, 1927.
J. A. AYERS
1,637,290
SOIL BREAKING MACHINE
Filed Dec. 13, 1925
3 Sheets-Sheet 1
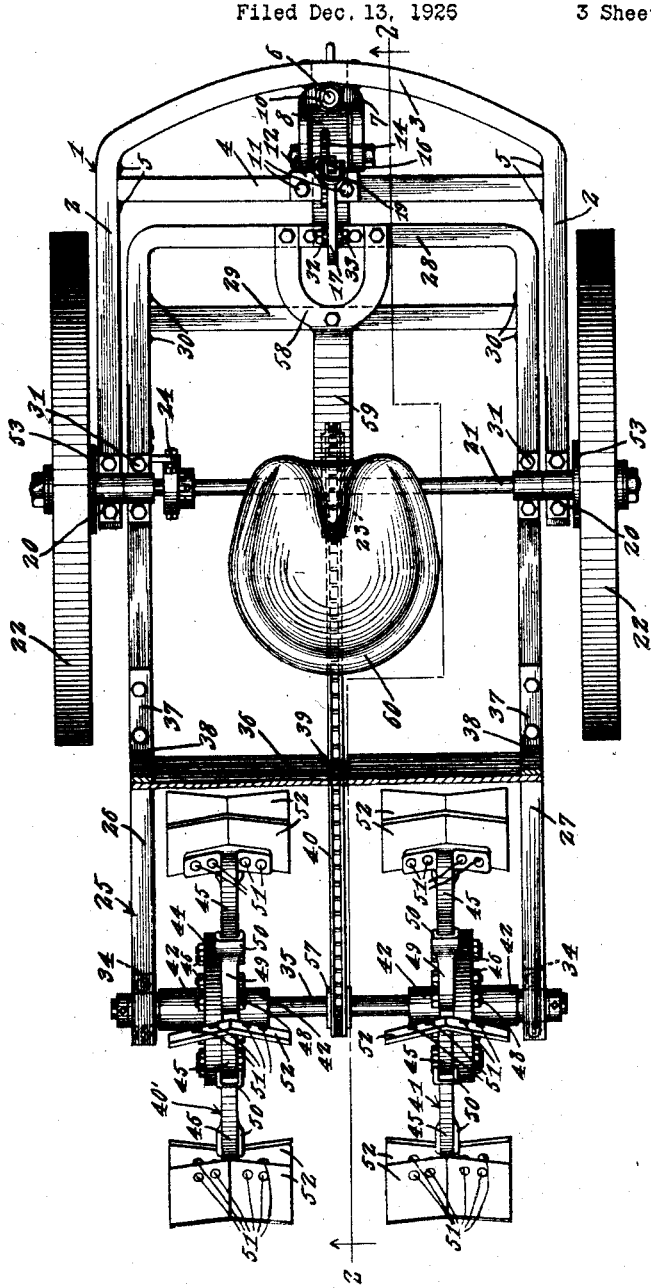
John A. Ayers, INVENTOR.
BY
Geo. F. Kimmel, ATTORNEY.

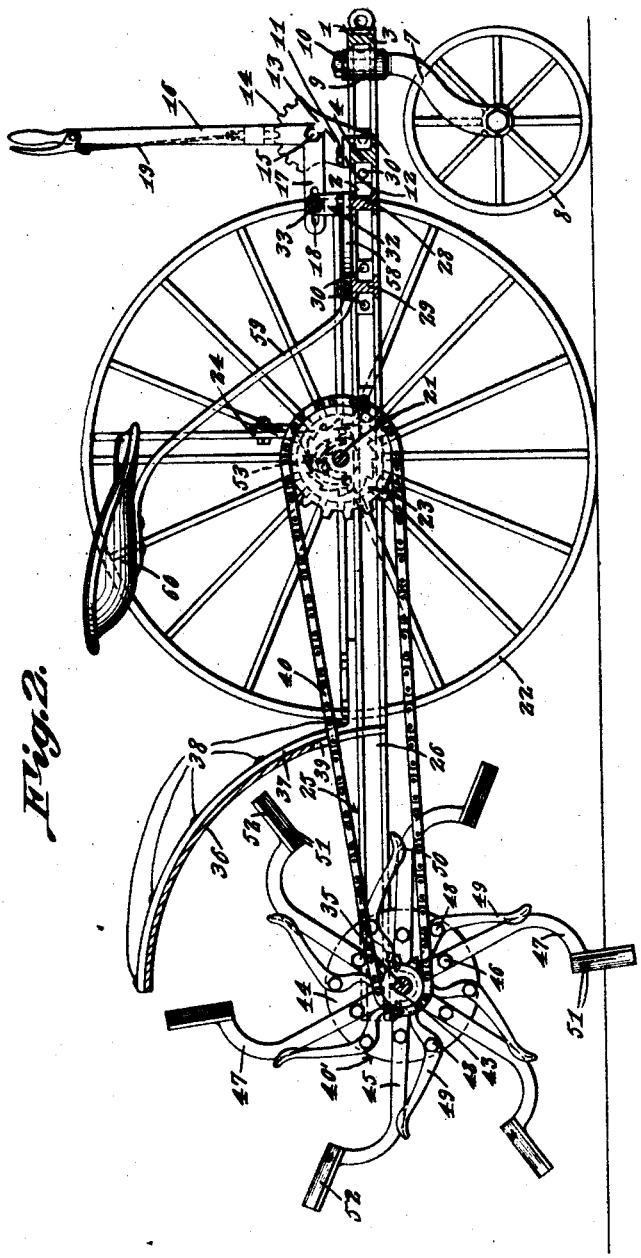

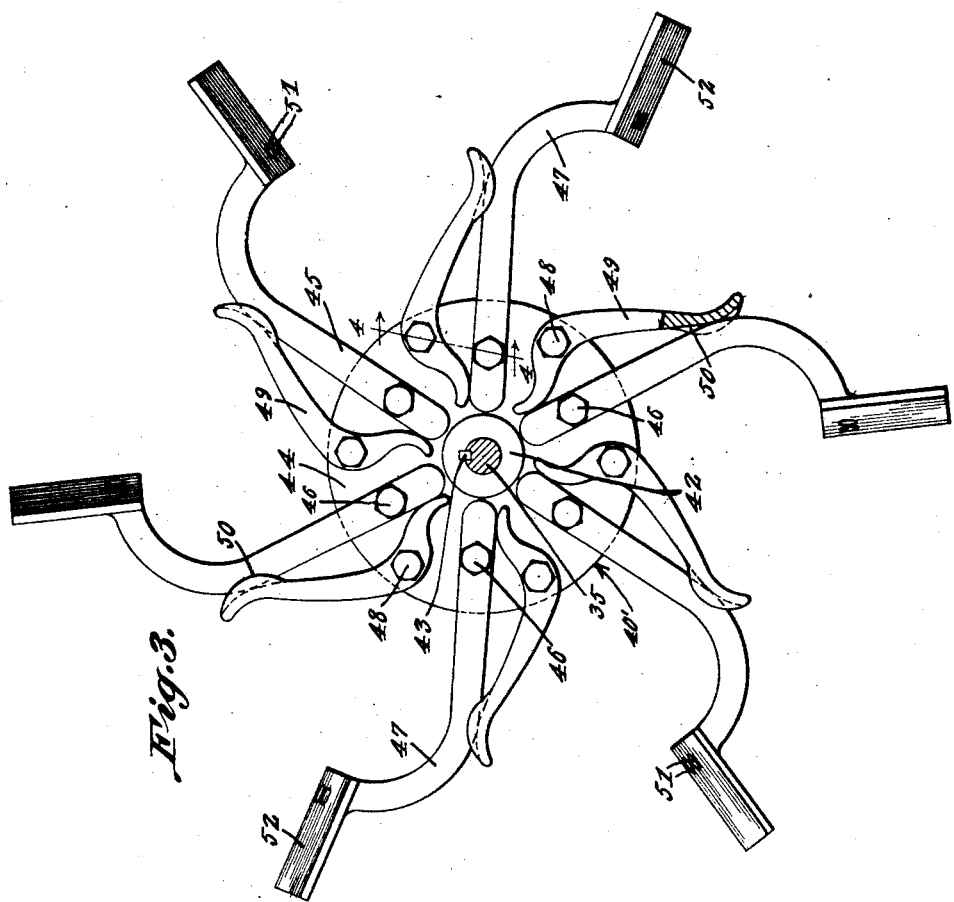

Patented July 26, 1927.

1,637,290

UNITED STATES PATENT OFFICE.

JOHN A. AYERS, OF LIMA, OHIO.

SOIL-BREAKING MACHINE.

Application filed December 13, 1926. Serial No. 154,525.

This invention relates to a machine for breaking the soil or ground, and has for its object to provide, in a manner as hereinafter set forth, a machine of the class referred to for pulverizing and breaking the soil with a view to preparing it for planting seed thereon without the necessity of harrowing the ground.

A further object of the invention is to provide, in a manner as hereinafter set forth, a machine of the class referred to for breaking and crushing all the clods and reducing the soil to a pulverized condition to get the soil ready for the seed.

Further objects of the invention are to provide a soil breaking machine, in a manner as hereinafter set forth, and which is comparatively simple in its construction and arrangement, strong, durable, compact, thoroughly efficient in its use, adjustable, readily assembled, and comparatively inexpensive to manufacture.

With the foregoing and other objects in view the invention consists of the novel construction, combination and arrangement of parts as hereinafter more specifically described, and illustrated in the accompanying drawings wherein is shown an embodiment of the invention, but it is to be understood that changes, variations and modifications can be resorted to which fall within the scope of the claims hereunto appended.

In the drawings wherein like reference characters denote corresponding parts throughout the several views:—

Figure 1 is a top plan view of a soil breaking machine in accordance with this invention.

Figure 2 is a section on line 2—2 Figure 1.

Figure 3 is a side elevation of one of the soil breaking elements.

Figure 4 is a section on line 4—4 Figure 3.

A machine, in accordance with this invention includes a longitudinally disposed supporting frame referred to generally by the reference character 1, and which consists of a U-shaped body portion 2 closed at its forward end, as at 3, and with the sides of the body portion 2, connected together in proximity to their forward ends, by a transversely extending I-beam 4, which is spaced from the closed forward end 3 of the body portion 2. The beam 4 is secured to the body portion 2, by the holdfast devices 5. Depending from the forward part of the body portion 2, is a front wheel support consisting of a shank 6 and an inverted depending fork 7, which straddles and has revolubly connected therewith, at its lower end, the front wheel 8. The body portion 2 centrally of the closed forward end thereof, has secured therewith, a rearwardly extending coupling member 9 which pivotally connects the shank 6 with the body portion 2. The fork 7 abuts against the lower face of the coupling member 9 and the upper end of the shank 6 carries a securing nut 10.

Secured to the beam 4, centrally thereof, by the holdfast devices 11 is a supporting bracket 12, which has formed integral therewith an upstanding plate 13 having its top edge toothed as at 14, to provide a semi-circular rack. Pivotally connected to the plate 13, as at 15 is an upstanding lever arm 16, provided at its lower end with a right angularly disposed and rearwardly extending arm 17, formed in its rear terminal portion with a longitudinally extending slot 18. Carried by the lever arm 16 is a spring controlled lever and dog mechanism 19 which coacts with the rack formed by the toothed edge of the plate 13, for the purpose of maintaining the lever arm 16 in its adjusted position. The purpose of the lever arm 16 will be hereinafter referred to.

Secured upon the upper face of each side of the body portion 2, at the rear thereof, is an axle bearing 20 and extending through the bearings 20 is a revoluble axle 21 having mounted on each end thereof, a side or traction wheel 22 of materially greater diameter than the front wheel 8. The wheels 22 are so disposed relative to the body portion 2, that they will extend a substantial distance thereabove. Loosely mounted on the axle 21, within the body portion 2, is a gear wheel 23 and carried by the axle 21 is a clutching mechanism 24 for coupling the gear wheel 23 to the axle 1, whereby on the revolving of the latter, the gear wheel 23 will be carried therewith.

Adjustably mounted on the axle 21, is a longitudinally extending support, referred to generally by the reference character 25 and which includes a yoke-shaped body portion formed of a pair of side bars 26, 27 and an end bar 28. The body portion 25 has a closed forward end and an open rear end. The side bars 26 and 27, of the body portion 25, are connected together in proximity to the end bar 28, by a transversely extending I-beam 29, which is spaced from said end bar 28, and said I beam 29 is secured to the side bars 26 and 27 by the holdfast devices 30. Secured upon the upper faces of the side bars 26, 27 and arranged in alinement with the bearings 20, are axle bearings 31 through which extends the axle 21. The clutching mechanism 24 is positioned in proximity to one of the axle bearings 31. The axle bearings 31 provide for the pivotally mounting of the body portion 25 upon the axle 21. Secured to the upper face of the end bar 28, centrally thereof, is a vertically disposed yoke-shaped member 32, carrying in proximity to its upper end a bolt 33 which extends through the slot 18 of the arm 17. The bolt 33 is suitably connected to the member 32. The bolt 33, in connection with the slot 18 provides means for slidably connecting the lever arm 16 to the pivot support, and said lever arm 16 provides means for adjusting the position of the support on the axle 21, whereby the rear end of the pivoted support can be elevated or lowered for a purpose to be presently referred to.

Secured to the lower face of the side bar 26, as well as the side bar 27, is a shaft bearing 34 and in which is journaled a shaft 35 which will be hereinafter referred to. Mounted upon the top of the bars 26, 27 is an upstanding rearwardly extending guard 36 of arcuate form in cross section, and which has its side edges flush with the outer side edges of the bars 26, 27. The guard 36 is secured to the bars 26 and 27 by straps 37 and holdfast devices 38, which engage in the guard 36 and also in the side bars 26 and 27. The bottom edge of the guard 36 is formed with a notch 39, centrally thereof, for the passage of an endless drive chain 40 and the purpose of the latter will be presently referred to.

The machine includes a pair of soil breaking elements, arranged in spaced relation, and one is referred to generally by the reference characters 40' and 41. The soil breaking elements are fixed to the shaft 35 and revolve therewith. As each of the soil breaking elements is of the same construction, but one will be described, as the description of one will apply to the other. Each soil breaking element comprises a hub 42 of substantial length and which is keyed, as at 43 to the shaft 35. The hub 42 is arranged on the shaft 35, at a point between its transverse center and one end thereof. Formed integral with the hub 42, intermediate its ends is a flange 44 of appropriate diameter and which has secured to the inner side face thereof a series of radially disposed spring controlled, ground breaking devices and each of the latter consists of a shank 45, pivoted in proximity to its inner end, as at 46, to the flange 44. The outer end terminal portion of the shank 45 is of curved contour, as indicated at 47 and the curvature of the said terminal portion 47 is such, that when the furrow breaking device is in its lowered position the said outer terminal 47 will project rearwardly. Fixedly secured to the inner side face of the flange 44, as at 48, is a bow shaped controlling spring 49 for the shank 45. The spring 49 is secured to the disk 44, at a point between the transverse median of the spring 49 and its inner end. The outer end of the spring 49, has its follower face provided with a lengthwise extending groove 50 for the reception of the shank 45, and whereby the said outer end of the spring 49 will overlap the side faces of the shank 45, see Figure 3. The outer end of the shank 45 is fixedly secured, by the holdfast devices 51, to the inner end of a breaker member 52, which inclines forwardly from its vertical center towards each side edge thereof or in other words the breaker member 52 is of V-shaped contour in sectional plan. The breaker member 52 is of a height to depend a substantial distance from the outer end of the shank 45 and further projects laterally in both directions from said shank 45. The holdfast devices 51, employed for securing the breaker member 52 to the shank 45, are positioned in close proximity to the inner end of the breaker member 52. The inner end of the spring 49 abuts against the shank 45, at a point between the securing means 46 therefor and the inner end terminal of said shank. The spring 49 constitutes a cushion for the breaker member 52 during the operation thereof and further acts as a means to maintain the shank 45 in the position shown in Figure 3. The pivot 46 for the shank 45 is clearly shown in Figure 4 and the means 48 for fixedly securing the spring 49 to the disk 44 is shown in Figure 4. The means 48 prevents the locking or tilting bodily of the spring 49 during the operation of the breaker element.

Each side wheel 8 is provided with a spring controlled ratchet mechanism 53, constructed and arranged to clutch the wheel only to the axle on the forward movement of the machine, whereby the axle is revolved, but on the rearward movement of the machine the wheel revolves independently of the axle, as the dogs of such mechanism ride over the ratchet thereof. The endless drive chain 40 is driven from the gear 23 when the latter is clutched to the axle 21. The chain 40 extends rearwardly and engages with the sprocket pinion 57, fixed to the shaft 35 for the purpose of revolving it.

The lever arm 16 provides means for tilting the body portion 25 for the purpose of elevating and lowering the soil breaking elements to decrease or increase the depth of the operation thereof with respect to the soil over which the machine travels.

Secured to the I beam 29 and end bar 28, is the base 58 of an upstanding and rearwardly inclined post, carrying a seat 60 for the operator. The end 3, of the body portion 2, carries a hitch 61 for connecting a tractor or other means for transporting the machine over the ground.

The guard 36 protects the operator from flying pieces of soil during the operation of the machine.

When the machine is transported over the ground, the soil breaking elements are operated, as they revolve with the shaft 35, and during the revolving of the soil breaking elements, the breaker members 52 will break up and pulverize the soil. The lever arm 16 provides means for moving the breaker elements clear of the ground and which can be held in such position. When the gear 23 is uncoupled from the shaft 21, the machine with the breaker elements elevated, can be moved off the ground without driving or revolving the breaker elements.

It is thought that the many advantages of a soil breaking machine, in accordance with this invention, can be readily understood, and although the preferred embodiment of the invention is as illustrated and described, yet it is to be understood that changes in the details of construction can be had which will fall within the scope of the invention as claimed.

What I claim is:

1. In a soil breaking machine a bodily revoluble ground breaking element comprising a hub provided intermediate its ends with an annular flange, a series of radially disposed shanks each pivotally connected at a point removed from its inner end to said flange, a bow shaped spring fixedly secured at a point between its transverse median and its inner end to said flange and having each of its ends bearing against a shank inwardly and outwardly with respect to the shank pivot, and a ground breaker member secured to the outer end of each shank.

2. In a soil breaking machine in accordance with claim 1, each of said breaker members inclining in opposite directions from its vertical median towards each side edge.

3. In a soil breaking machine in accordance with claim 1, each of said springs having the follower face at its outer end grooved to overlap a shank.

4. In a soil breaking machine in accordance with claim 1, each of said shanks having a rearwardly directed curved outer terminal portion to which the breaker member is secured.

In testimony whereof, I affix my signature hereto.

JOHN A. AYERS.